United States Patent [19]

Bauer

[11] 4,108,141
[45] Aug. 22, 1978

[54] GRILLING APPARATUS
[75] Inventor: Hans Bauer, Dettingen, Teck, Germany
[73] Assignee: Dietz-metall GmbH & Co. KG., Unterensingen, Germany
[21] Appl. No.: 690,379
[22] Filed: May 27, 1976
[30] Foreign Application Priority Data
Aug. 21, 1975 [DE] Fed. Rep. of Germany ... 7526494[U]
Oct. 24, 1975 [DE] Fed. Rep. of Germany ....... 2547585
[51] Int. Cl.² .......................... A47J 37/00; F24B 3/00
[52] U.S. Cl. .................................. 126/41 R; 99/340; 99/422; 126/9 R; 126/38; 126/220
[58] Field of Search ................. 126/41 R, 39 J, 39 K, 126/218, 214 D, 220, 38, 25 R, 25 A, 9 R; 99/339, 340, 401, 442, 447, 422; 220/333, 332, 330

[56] References Cited
U.S. PATENT DOCUMENTS

| 1,011,675 | 12/1911 | Tremouley | 126/25 R |
| 3,189,016 | 6/1965 | Corley | 126/38 |
| 3,542,009 | 11/1970 | Warner | 126/25 R |
| 3,552,301 | 1/1971 | McNeff | 126/25 R X |
| 3,693,534 | 9/1972 | Martin | 126/25 R X |
| 3,785,275 | 1/1974 | Keats et al. | 126/25 R X |
| 3,895,622 | 7/1975 | Krueger | 126/38 |
| 3,899,961 | 8/1975 | Tanguy | 126/38 X |

FOREIGN PATENT DOCUMENTS

| 102,976 | 5/1899 | Fed. Rep. of Germany | 126/220 |
| 8,473 | 7/1902 | Fed. Rep. of Germany | 220/330 |
| 146,320 | 11/1903 | Fed. Rep. of Germany | 126/41 R |

Primary Examiner—William F. O'Dea
Assistant Examiner—Harold Joyce

[57] ABSTRACT

An improved portable grill construction employing a hood pivotally mounted to an underlying grill tub which supports a grilling grate and a heating element in spaced relation is described. The hood and the tub are manufactured from identical lightweight shells each having a deep portion and an adjacent shallow portion, which are mounted in confronting symmetrical relation to define a closed contour when the hood is closed. The top surface of the hood is apertured, and a separate insert member adapted for holding a container for food or liquid to be heated when the hood is closed, is removably mounted in the aperture and is so dimensioned as to yield an air-permeable gap around its entire periphery for efficient heating of the container. The hood is associated with the tub through a U-shaped member which folds flat when the hood is closed to define a carrying handle.

5 Claims, 7 Drawing Figures

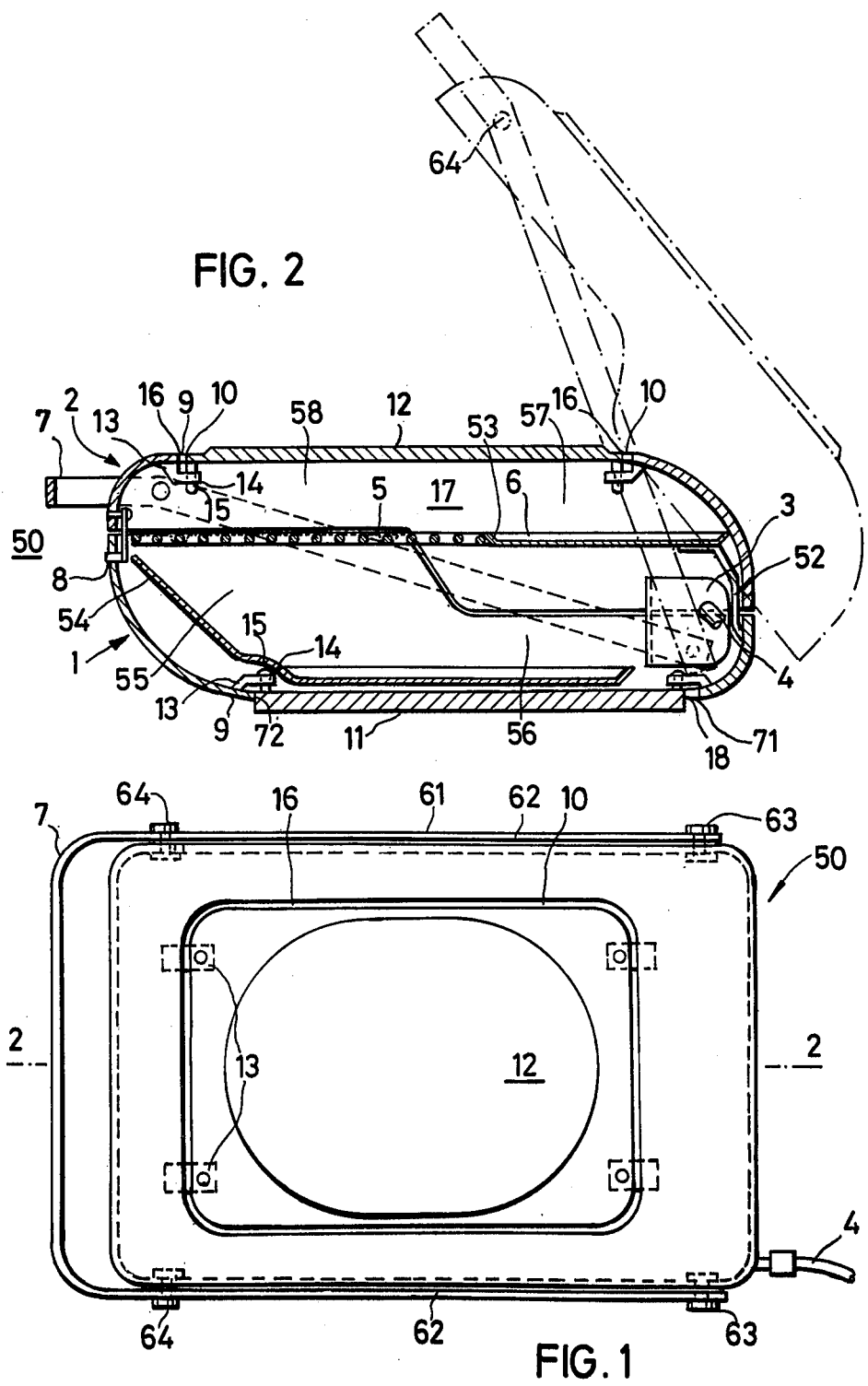

4,108,141

GRILLING APPARATUS

BACKGROUND OF THE INVENTION

The invention relates to grill assemblies and more particularly to grill assemblies in which a hood is pivotally associated with an underlying grilling tub for movement between a closed position and at least one open position.

In grill assemblies of this type, a suitable heating element is generally disposed in a rear portion of the grill tub, and a grilling grate is supported on the tub above and forwardly of the heating element. When the hood is in an open position, food disposed on the grate is heated by the element both directly from below and indirectly from above via reflection of heat from the hood. When the hood is in the closed position, a limited degree of food preparation (i.e., warming and/or baking) is possible.

Such known designs have lacked flexibility for the versatile preparation of foods, particularly when the hood is in the closed position. Such problems, which have prevented the apparatus from being used for the heating of liquids, roasting of solid foods, and the like, arise principally from problems of inadequate access to the product to be heated and relatively low heating efficiency.

Additionally, such assemblies have been difficult and expensive to manufacture because of the necessity of employing and stockpiling separate tools for the formation of the hood and the tub.

Also, such assemblies, while nominally portable, are in practice relatively heavy and clumsy to transport, so that their utility for camping applications and the like is impaired.

SUMMARY OF THE INVENTION

Such disadvantages are overcome with the improved grilling apparatus of the present invention.

In an illustrative embodiment, a planar top surface of the pivotally mounted hood is provided with an aperture for receiving an insert member, illustratively a plate or pan that supports a container for liquids to be heated or foods to be roasted or similarly prepared. The periphery of the insert member is centrally supported in the aperture of the hood, and the periphery of the insert member cooperates with the periphery of the surrounding aperture to define at least one circumferential, air-permeable gap. With such arrangement, heat emitted by the heating element in the tub can heat the container supported by the plate not only directly from below, but also from the sides via the hot air flowing out of the hood through the gap surrounding the insert member. The removable nature of the plate permits various types of containers, and thereby various types of foodstuffs and liquids, to be accommodated in the grill apparatus when the hood is in the closed position.

Advantageously, the insert member is made removable from the hood so that a plurality of such members (e.g., support plates, roasting pans, etc.) can be interchanged.

Preferably, the hood and the tub are made from identical shells each having a relatively deep portion and an adjacent relatively shallow portion. The hood is so mounted that in its closed position it confronts the underlying tub in symmetrical fashion, with the deep portion of the hood overlying the shallow section of the tub and vice-versa. Such shells may be made from lightweight material, such as aluminum castings.

In order to provide convenient portability of the apparatus, the manner of pivotal mounting of the hood to the tub includes a U-shaped member wherein a pair of parallel legs are pivotally joined at their rear end to the shallow section of the tub, while a front portion of the legs are joined to a front section of the hood. The crosspiece of the U-shaped member is disposed forwardly of the pivotal connection with the hood, so that when the hood is in the closed position, the crosspiece extends forwardly of the aligned front surfaces of the hood and the tub to define a carrying handle.

For increased efficiency of heating, the heating element, which may be of the gas-operated infrared type, extends above the top surface of the relatively shallow rear portion of the tub.

Additionally, the planar bottom surface of the tub may be provided with a central aperture similar to the aperture in the hood top surface, with such aperture in the tub receiving a bottom plate or other insert member whose rear surface is spaced from the adjacent surface of the aperture to define another air inlet passage for the heating element.

BRIEF DESCRIPTION OF THE DRAWING

The invention is further set forth in the following detailed description taken in conjunction with the appended drawing, in which:

FIG. 1 is a plan view of a first embodiment of a grilling apparatus constructed in accordance with the invention;

FIG. 2 is a sectional view taken along line 2—2 of FIG. 1;

DETAILED DESCRIPTION

Figure 4:
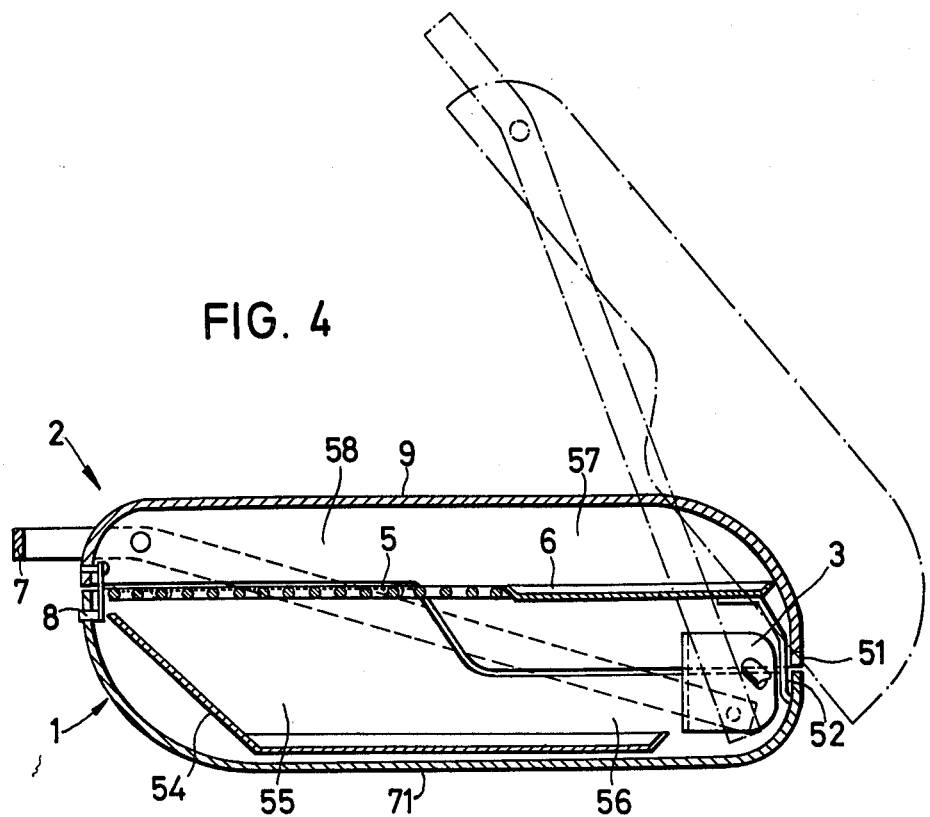
FIG. 4 is a sectional view taken along line 4—4 of FIG. 3.

Referring now to the drawing and more particularly to FIGS. 1 and 2, the numeral 50 represents a portable version of a grill assembly which consists of a horizontally disposed tub section 1 which is pivotally associated, in the manner described below, with a hood 2. The hood 2 is movable from a closed position, depicted in solid lines in FIG. 2, to one or more open positions, one of which is shown in dot-dash lines in FIG. 2.

A heating element 3, illustratively of the gas-operated infrared type, is disposed in a rear portion of the tub 1. The heating element 3 is supplied with fuel from a suitable source (not shown) over a conductor 4.

A conventional grilling grate 5 is horizontally supported on the tub 1 in a position forwardly of and above the heating element 3. In this position, food placed on the grate 5 may be heated from below by direct rays from the element 3. Additionally, when the hood 2 is positioned into a partially open position as shown in the dot-dash lines in FIG. 2, other heat rays emanating from the element 3 are deflected off the inner surface of the hood as a hot air current toward the grate 5, such deflected air current impinging from above on the food supported on the grate 5. The combined heating of such food from above and below greatly increases the efficiency of grilling.

A tray 6, containing a flat bottom, is suitably supported by means of a bracket 52 within the tub 1 for directly supporting foods to be heated or for baking with the hood closed. As indicated, a forward lip 53 of the tray 6 abuts the rear edge of the grate 5.

A drip pan 54 is removably supported in the tub 1 below the grate 5 in order to catch juices and fats which may fall from food being cooked on the grate.

The tub 1 is illustratively formed from lightweight material, such as aluminum, and exhibits a front relatively deep portion 55 and a rear relatively shallow portion 56. The grate 5 is mounted as shown on the upper surface of the portion 55. In order to increase the efficiency of the heating element 3, the upper portion of such element may extend upwardly beyond the top surface of the tub portion 56 in which it is disposed.

In order to eliminate the necessity of designing and stockpiling separate tools for the manufacture of the tub 1 and the hood 2, the hood 2 is formed of identical shape and material as that of the tub 1. Accordingly, the hood exhibits a relatively deep portion 57 and a relatively shallow portion 58. In the closed position, the hood confronts the underlying tub 1 in symmetrical fashion, whereby the shallow portion 58 of the hood overlies the deep portion 55 of the tub, and the deep portion 57 of the hood overlies the shallow portion 56 of the tub. Because of the identical formation of the hood and tub, such components cooperate, when the hood is closed, to define a closed, compact periphery of the grilling apparatus 50.

In order to enhance the portability of the assembly 50, the manner of pivotal attachment of the hood to the tub is accomplished through the intermediary of a U-shaped member 61 that includes a pair of parallel legs 62, 62 which are connected together at their front ends by a crosspiece 7.

The legs 62 straddle opposite sides of the tub 1 and are pivotally connected at their rear ends, via pins 63, to the rear portion of the shallow section 56. Such legs 62 are also pivotally joined, at a relatively forward point thereof, to the front shallow section 58 of the hood 2 via pins 64. The crosspiece 7 is disposed forwardly of the pins 64, so that when the hood is rotated into its closed position as shown in FIG. 2, the crosspiece 7 lies flat in front of the aligned forward surfaces of the tub 1 and the hood 2 to constitute a carrying handle.

In order to assure that the tub 1 and the hood 2 are mutually immobilized for portability purposes, such components may be removably joined at their front ends by means of a clip 8 or similar means.

In order to increase the versatility of the grilling apparatus 50 to permit, e.g., the more efficient heating of liquids and roasting of foods when the grill 2 is in its closed position, an upper planar wall 9 of the hood 2 is provided with an aperture 10, illustratively rectangular in cross-section, for removably receiving a container support plate 12. Although not specifically illustrated, the plate 12 is illustratively adapted to hold a food or liquid container when the hood is closed. The plate 12 may, like the surrounding periphery of the aperture 10, have a rectangular cross-section; but the respective cross-sectional dimensions of the plate 12 are each sufficiently smaller than the corresponding dimensions of the aperture 10 as to yield an air-permeable gap 16 extending completely around the periphery of the plate 12 as shown.

In order to removably support the plate 12 in spaced relation to the aperture 10, a plurality of straps 13 are attached to the top surface 9 of the hood 2, such straps exhibiting through-holes 14 for the reception of mating projections 15 on the front and rear ends of the plate 12.

With the arrangement depicted, food or liquid supported in the container associated with the plate 12 when such plate is in the position shown in FIG. 2 may be heated not only from below but also from all sides around it, by virtue of hot air exiting through the surrounding gap 16. Accordingly, the efficiency of heating such food or drink is greatly increased.

Because of the identical construction of the tub 1 and the hood 2, a lower surface 71 of the tub 1 may be provided with a central aperture 72 corresponding to the aperture 10 in the upper hood surface 9. Such aperture 72 may be removably closed by means of a bottom plate 11, whose shape corresponds to that of the aperture 72 but which has a front-rear dimension somewhat smaller than that of the aperture 72 to define an air passage 18 between the rear surface of the plate 11 and the adjacent front surface of the bottom wall 71. As indicated in FIG. 2, such gap 18 may be disposed below the heating element 3 in the shallow rear section 56 of the tub 1, thereby increasing the efficiency of air supply to the element 3.

Figure 3:
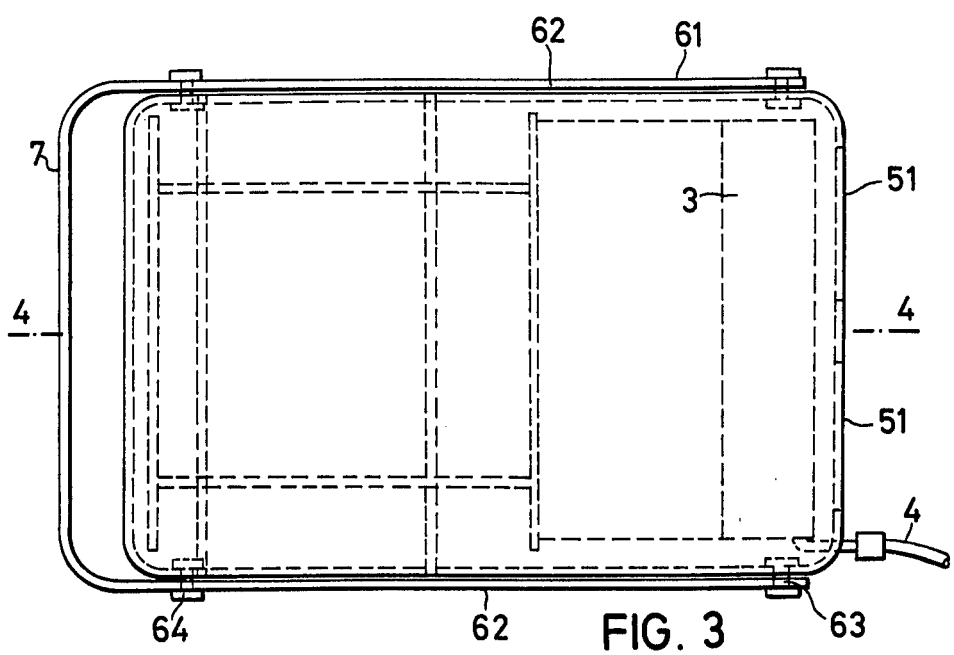
FIG. 3 is a plan view of an alternative form of grilling apparatus constructed in accordance with the invention.

An alternative embodiment of the grill assembly 50 of FIGS. 1 and 2 is indicated in FIGS. 3 and 4. Corresponding elements of the two embodiments have been given corresponding reference numerals. The embodiment of FIGS. 3-4, differs from that of FIGS. 1-2 only in that the top wall 9 of the hood 2 and the corresponding bottom wall 71 are each solid, rather than apertured as in FIGS. 1-2. Accordingly, the use of plates 11, 12 and the associated mounting elements 13-16 are missing from FIGS. 3-4. In addition, the assembly 50 may be provided with air inlet apertures 51, which in the particular arrangement of FIGS. 3-4 are located in the rear surface of the hood. As is well-known, however, such apertures may be disposed in any other convenient location in the tub 1 or the hood 2. In all other respects, the two embodiments are identical.

Figure 5:
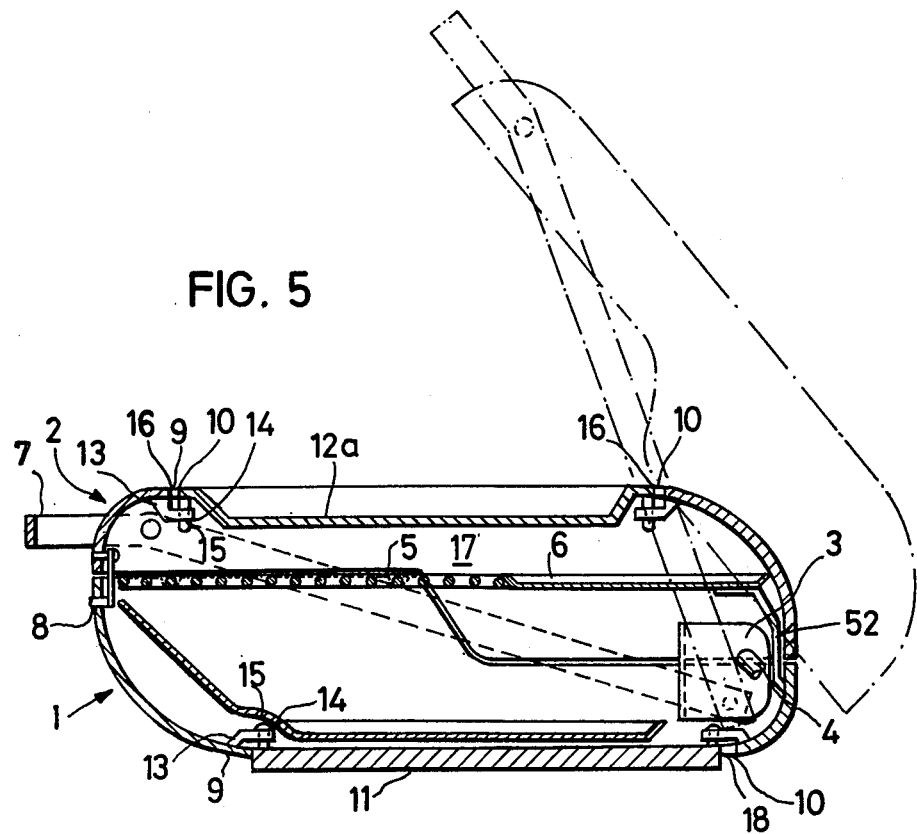
FIG. 5 is a sectional elevation view, similar to FIG. 2, of an alternative form of grilling apparatus constructed in accordance with the invention, illustrating an alternative form of insert member supportable within a rectangular central aperture in the hood.

FIG. 5, which is basically similar to the arrangement of FIGS. 1-2, employs a different type of insert member (designated 12a) within the rectangular aperture 10 than the plate 12 of FIGS. 1-2. The insert member 12a illustratively in the form of a roasting or baking pan, on which foods can be suitably processed, e.g., with the hood 2 closed. As in FIGS. 1-2, a circumferential air passage 16 extends completely around the periphery of the pan 12a to provide communication between the interior 17 of the closed assembly and the outside air. Again, because of the removable mounting arrangement for the plate 12a in the form of the elements 13-15, different types of insert members can be interchangeable with each other for various food processing applications.

Figure 7:
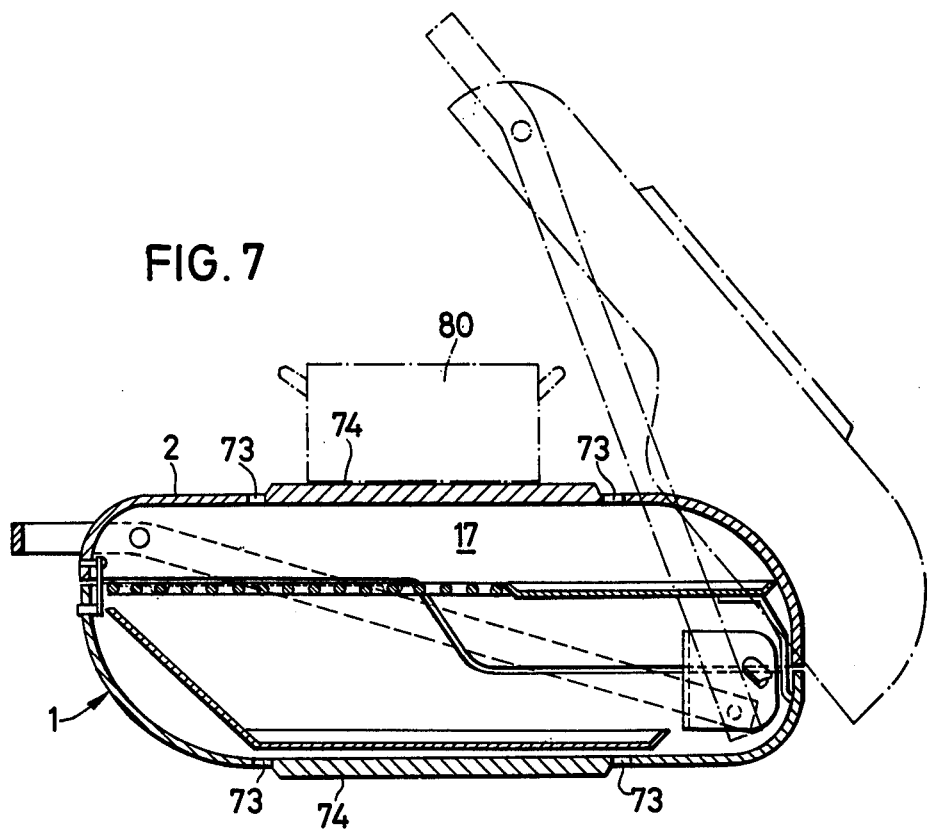
FIG. 7 is a sectional view taken along line 7—7 of FIG. 6.
Figure 6:
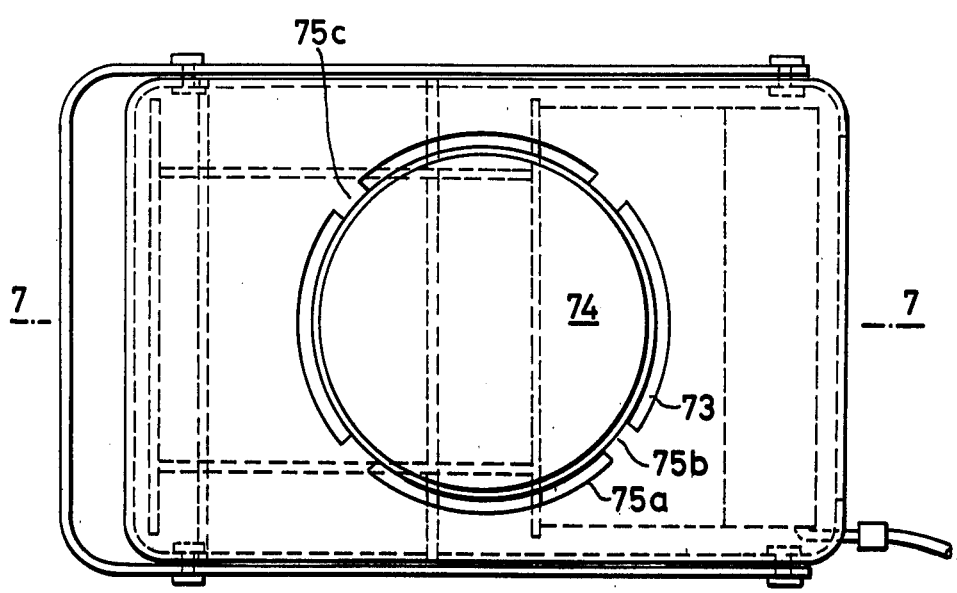
FIG. 6 is a plan view of still another alternative embodiment of grilling apparatus constructed in accordance with the invention, illustrating a hood having a segmented periphery and a circular insert member that cooperates with the segmented periphery of the hood.

In the alternative embodiment of FIGS. 6-7, the corresponding upper surface of the hood 2 and lower surface of the tub 1 are provided with a central circular aperture which exhibits segmental, circumferentially spaced recesses 75a, 75a to define spaced air passages 73, 73, with the adjacent segments being respectively separated by integral ribs 75b, 75b. The inner periphery of the segmented apertures 75a cooperates with that of the ribs 75b to define a circular outer periphery 75c of an insert member 74. The function of the spaced passages 73 correspond to that of the continuous passage 16 of FIGS. 1–2 and 5. Identical passages 73 are disposed in the tub 1 and the hood 2.

As indicated in FIGS. 6–7, the insert member 74 may take the form of a plate for supporting a vessel 80 adapted for the boiling of liquids. Alternatively, the member 74 may take the form of a broiling or roasting pan, similar to the pan 12a of FIG. 5.

In the foregoing, several illustrative arrangements of the invention have been described. Many variations and modifications will now occur to those skilled in the art. It is accordingly desired that the scope of the appended claims not be limited to the specific disclosure herein contained.

What is claimed is:

1. In a grill assembly, a grill tub having a planar lower surface, a heating element disposed in the tub, a hood having a planar upper surface, the hood and tub having identical shapes, means mounting the hood for pivotal movement with respect to the tub between a closed position and at least one open position, the upper surface of the hood exhibiting a first aperture, and a first insert member supported within the first aperture and having a peripheral surface cooperable with the surrounding first aperture to define at least one first circumferential air passage therebetween, the first air passage effecting communication between the outside air and the interior of the assembly when the hood is in the closed position, the hood and the grill tub defining identical axially coextensive unitary housings each having a relatively deep section and an adjacent relatively shallow section, the pivotal mounting means supporting the hood in confronting axially coextensive symmetrical relation with the grill tub when the hood is in its closed position whereby the shallow section of the hood overlies the deep section of the tub and the deep section of the hood overlies the shallow section of the tub to yield a substantially closer contour, the upper surface of the hood conforming to the lower surface of the tub, the shallow section of the tub being disposed rearwardly of the deep section thereof, and the heating element being disposed in the shallow section of the tub and extends above the upper surface of the shallow section of the tub.

2. In a portable grill assembly having a grill tub, a heating element disposed in the grill tub, a hood, the hood and tub having identical shapes, and means for pivotally supporting the hood with respect to the tub for movement between a closed position and at least one open position, the improvement wherein the hood and the tub define identical axially coextensive unitary housings each exhibiting a relatively deep section and an adjacent relatively shallow section, and wherein the pivotal supporting means supports the hood in confronting axially coextensive symmetrical fashion with respect to the tub so that the shallow section of the hood overlies the deep section of the tub and the deep section of the hood overlies the shallow section of the tub to yield a substantially closed contour when the hood is closed, the pivotal supporting means comprising in combination a U-shaped member having a pair of parallel legs disposed in straddling relation to the sides of the grill tub and a crosspiece extending between the forward ends of the legs, the means for pivotally supporting the hood with respect to the tub comprising means for pivotally connecting the rear portions of the respective legs to the rear portion of the adjacent sides of the tub, and means for pivotally connecting the forward ends of the respective legs of the U-shaped member to the forward portion of the adjacent sides of the tub hood rearwardly of the crosspiece, whereby the crosspiece is disposed forwardly of the front surface of the tub when the hood is in the closed position.

3. A grill assembly as defined in claim 2, further comprising means for removably joining the front ends of the hood and the tub when the hood is in the closed position.

4. A grill assembly as defined in claim 2, in which the deep section of the hood exhibits at least one aperture in its rear surface.

5. In a grill assembly, a grill tub having a planar lower surface, a heating element disposed in the tub, a hood having a planar upper surface, means mounting the hood for pivotal movement with respect to the tub between a closed position and at least one open position, the upper surface of the hood exhibiting a first aperture, and a first insert member supported within the first aperture and having a peripheral surface cooperable with the surrounding first aperture to define at least one first circumferential air passage therebetween, the first air passage effecting communication between the outside air and the interior of the assembly when the hood is in the closed position, the first aperture exhibiting a substantially circular periphery defined by a plurality of circumferentially spaced segmental recesses, the first insert member having a circular periphery corresponding essentially to the unrecessed periphery of the first aperture, the assembly further comprising means for centrally supporting the first insert member in the first aperture to define a plurality of the first circumferential air passages between the periphery of the first insert member and the recesses of the first aperture, the planar lower surface of the grill tub exhibiting a segmented circular periphery corresponding to the periphery of the first aperture, the assembly further comprising in combination a second insert member having a circular periphery corresponding essentially to the unrecessed periphery of the second aperture, and means for centrally supporting the second insert member within the second aperture to define a plurality of second circumferential air passages between the periphery of the second insert member and the recesses of the second aperture.

* * * * *